United States Patent
Kusatsugu et al.

(10) Patent No.: US 8,149,316 B2
(45) Date of Patent: Apr. 3, 2012

(54) IMAGING APPARATUS WITH A ROTATABLE MONITOR

(75) Inventors: Takashi Kusatsugu, Aichi (JP); Yutaka Takahashi, Aichi (JP); Kenichi Kuroyanagi, Aichi (JP)

(73) Assignee: Sony Corporation, Tokyo (JP)

(*) Notice: Subject to any disclaimer, the term of this patent is extended or adjusted under 35 U.S.C. 154(b) by 441 days.

(21) Appl. No.: 12/368,376

(22) Filed: Feb. 10, 2009

(65) Prior Publication Data

US 2009/0207303 A1 Aug. 20, 2009

(30) Foreign Application Priority Data

Feb. 15, 2008 (JP) ................ P2008-034979

(51) Int. Cl.
*H04N 5/222* (2006.01)
*H04N 5/225* (2006.01)
*G03B 13/02* (2006.01)

(52) U.S. Cl. ............. 348/333.06; 348/374; 396/374

(58) Field of Classification Search ......... 348/333.01, 348/333.06, 333.07, 333.08, 333.09, 374; 396/374

See application file for complete search history.

(56) References Cited

U.S. PATENT DOCUMENTS

| | | | | |
|---|---|---|---|---|
| 7,526,195 B2 * | 4/2009 | Oh | ............... | 396/287 |
| 7,808,544 B2 * | 10/2010 | Ito | ............... | 348/349 |
| 7,885,537 B1 * | 2/2011 | Kuss | ............... | 396/374 |
| 2005/0041130 A1 * | 2/2005 | Yoon et al. | ............... | 348/333.01 |
| 2006/0211457 A1 * | 9/2006 | Otsuka | ............... | 455/575.1 |
| 2006/0274184 A1 * | 12/2006 | Hayashi | ............... | 348/333.06 |
| 2007/0242150 A1 * | 10/2007 | Terada | ............... | 348/333.06 |
| 2008/0225156 A1 * | 9/2008 | Kim | ............... | 348/333.06 |

FOREIGN PATENT DOCUMENTS

| | | | |
|---|---|---|---|
| JP | 08-098068 | | 4/1996 |
| JP | 10229286 A | * | 8/1998 |
| JP | 11126988 A | * | 5/1999 |
| JP | 11-305292 | | 11/1999 |
| JP | 2000-050117 | | 2/2000 |
| JP | 2001333298 A | * | 11/2001 |
| JP | 2003153048 A | * | 5/2003 |
| JP | 2005-101779 | | 4/2005 |
| JP | 2006308846 A | * | 11/2006 |
| JP | 2010026090 A | * | 2/2010 |

* cited by examiner

*Primary Examiner* — John Villecco
(74) *Attorney, Agent, or Firm* — Finnegan, Henderson, Farabow, Garrett & Dunner, L.L.P.

(57) ABSTRACT

An imaging apparatus includes an apparatus body, a monitor connected to the apparatus body, and a hinge mechanism including a support member. The supporting mechanism includes a mounting portion on a first end, the mounting portion being rotatably mounted on the apparatus body, and a supporting portion on a second end, the supporting portion supporting the monitor. The support member rotatably supports the monitor relative to the apparatus body. The support member of the hinge mechanism is disposed at substantially the same height as that of a viewfinder disposed on the apparatus body.

17 Claims, 21 Drawing Sheets

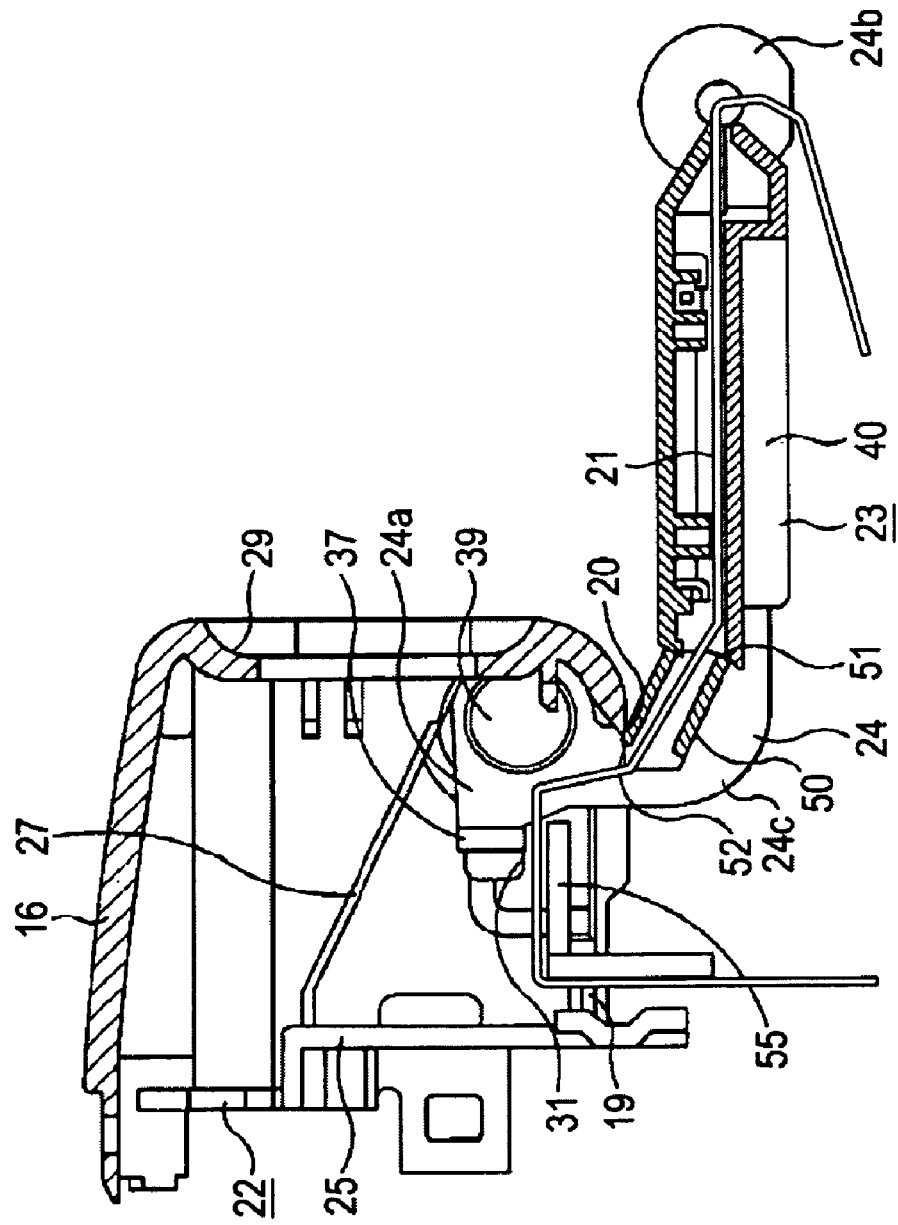

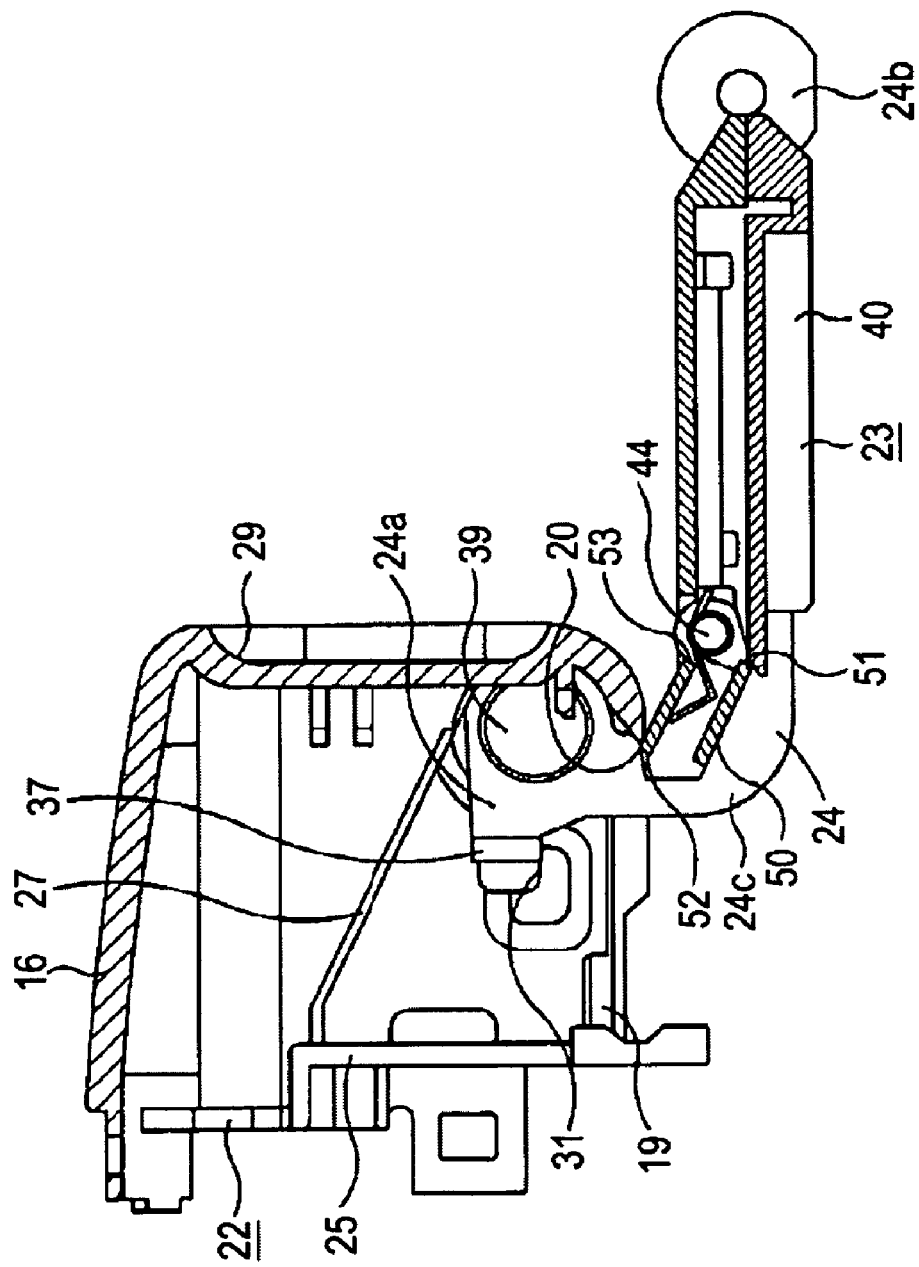

IMAGING APPARATUS WITH A ROTATABLE MONITOR

CROSS REFERENCES TO RELATED APPLICATIONS

The present invention contains subject matter related to Japanese Patent Application JP 2008-034979 filed in the Japanese Patent Office on Feb. 15, 2008, the entire contents of which are incorporated herein by reference.

BACKGROUND OF THE INVENTION

1. Field of the Invention

The present invention relates to an imaging apparatus including a viewfinder and a monitor that displays an image captured by the apparatus body, and in particular, to an imaging apparatus having a monitor rotatably mounted on the apparatus body.

2. Description of the Related Art

An imaging apparatus such as a digital camera has a monitor of a liquid crystal display (LCD) panel or the like on the apparatus body. With the monitor, a user can check an image captured by the imaging apparatus body on the spot. The monitor is generally installed in the back surface of the apparatus body that faces the user when a user takes a picture. The user can take pictures while checking the image captured by the apparatus body with a viewfinder or the monitor in accordance with shooting conditions. The user can also check a taken image with the monitor.

A digital camera proposed in recent years has a monitor that is provided as a different member from the apparatus body, and the monitor is rotatably supported relative to the apparatus body. In such a digital camera, one end of a support arm is rotatably mounted on the back surface of the apparatus body, and the monitor is mounted on the other end of the support arm. With this structure, viewability of the monitor is maintained by rotating the monitor, even when a user is in a position in which it is difficult for the user to face the back surface of the apparatus body. (Japanese Unexamined Patent Application Publication No. 08-098068)

SUMMARY OF THE INVENTION

FIG. 13 shows a digital camera 100 whose monitor is rotatably supported by the apparatus body. The digital camera 100 has a viewfinder 102 that is disposed at the top of the back surface 101a of the camera body 101 and a support arm, one end of which is mounted on the back surface 101a at a position lower than the viewfinder 102. Therefore, on the back surface 101a of the camera body 101, the viewfinder 102, a hinge portion 103 on which the support arm is mounted, and a monitor 104 supported by the support arm are aligned in the height direction. Hence the height of the camera body 101 is increased, which reduces portability and an aesthetic property in design. Alternatively, if the size of the monitor 104 is decreased to provide a low-profile apparatus body, viewability of the monitor 104 is reduced.

It is desirable to provide an imaging apparatus having a low-profile apparatus body while maintaining viewability of a monitor.

According to an embodiment of the present invention, an imaging apparatus includes an apparatus body; a monitor connected to the apparatus body; and a hinge mechanism including a support member having a mounting portion on a first end, the mounting portion being rotatably mounted on the apparatus body, and a supporting portion on a second end, the supporting portion supporting the monitor, the support member rotatably supporting the monitor relative to the apparatus body, wherein the support member of the hinge mechanism is disposed at substantially the same height as a viewfinder disposed on the apparatus body.

In the imaging apparatus according to the embodiment of the present invention, the support member that supports the monitor is disposed at substantially the same height as the viewfinder. Therefore, the viewfinder, the support member, and the monitor do not align in the height direction, which allows a use of a larger monitor while keeping a low-profile of the apparatus body.

BRIEF DESCRIPTION OF THE DRAWINGS

FIG. 9A is a sectional view showing the hinge mechanism and the shield member in a position in which the support member is rotated by substantially 90 degrees from the normal position, and the area through which the flexible substrate extends;

FIG. 9B is a sectional view showing the hinge mechanism and the shield member in a position in which the support member is rotated by substantially 90 degrees from the normal position, and the area where the torsion coil spring is engaged;

DESCRIPTION OF THE PREFERRED EMBODIMENTS

Figure 1:
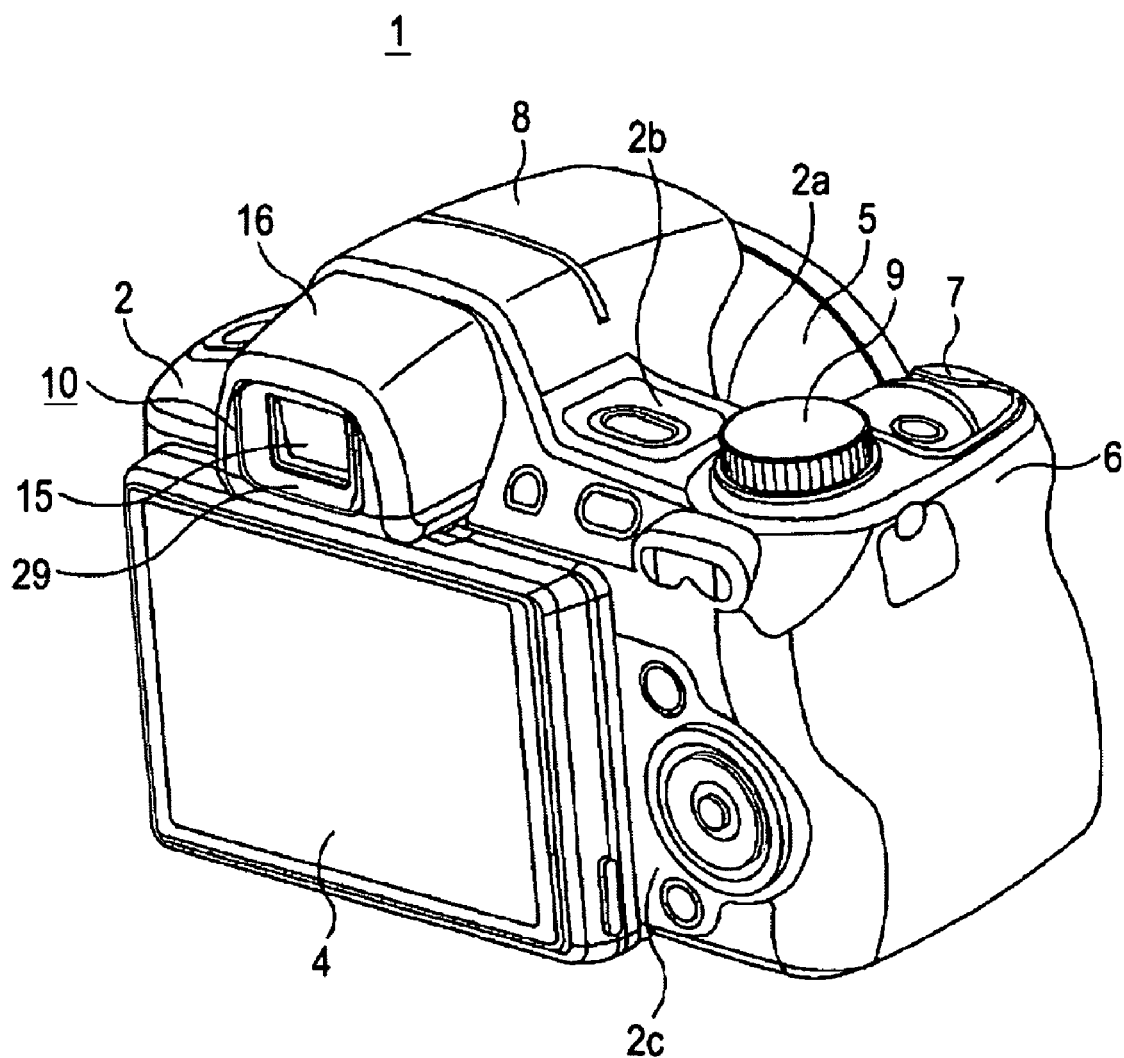
FIG. 1 is a rear perspective view of an imaging apparatus according to an embodiment of the present invention in a normal position in which a liquid crystal monitor is in contact with a back surface of a camera body.

Hereinafter, an imaging apparatus according to an embodiment of the present invention is described in detail with reference to the drawings. FIG. 1 shows an imaging apparatus 1, which is a digital still camera or a film camera. The imaging apparatus 1 includes a camera body 2 and a liquid crystal monitor 4. The liquid crystal monitor 4 is supported by a hinge mechanism 3 such that the liquid crystal monitor 4 is rotatable relative to the camera body 2.

The camera body 2 is substantially rectangular in cross-section so that the user can easily hold the body with one hand. The camera body 2 has a lens barrel 5 containing an image-taking lens on a front surface 2a, and a grip 6 that bulges out. A user can stably hold the camera body 2 with the grip 6 bulging toward the front surface 2a. A shutter button 7 is provided on the grip 6 of the camera body 2 so that the user can readily click the shutter button 7 while holding the camera body 2. Such camera body 2 effectively reduces motion blur or the like, since the user can click the shutter while firmly holding the camera body 2.

The camera body 2 has a pop-up flash 8 and a dial 9 on a top surface 2b. A user selects an operation mode and a shooting condition with the dial 9. The camera body 2 has the liquid crystal monitor 4, an electronic viewfinder 10, and various operation buttons on a back surface 2c. The liquid crystal monitor 4 displays an image captured through the image-taking lens or a taken image.

The electronic viewfinder 10 includes a viewfinder block 15 and an eyecup 16 covering the viewfinder block 15. The electronic viewfinder 10 displays an image to be captured through the lens barrel 5 by the camera body 2.

Figure 2:
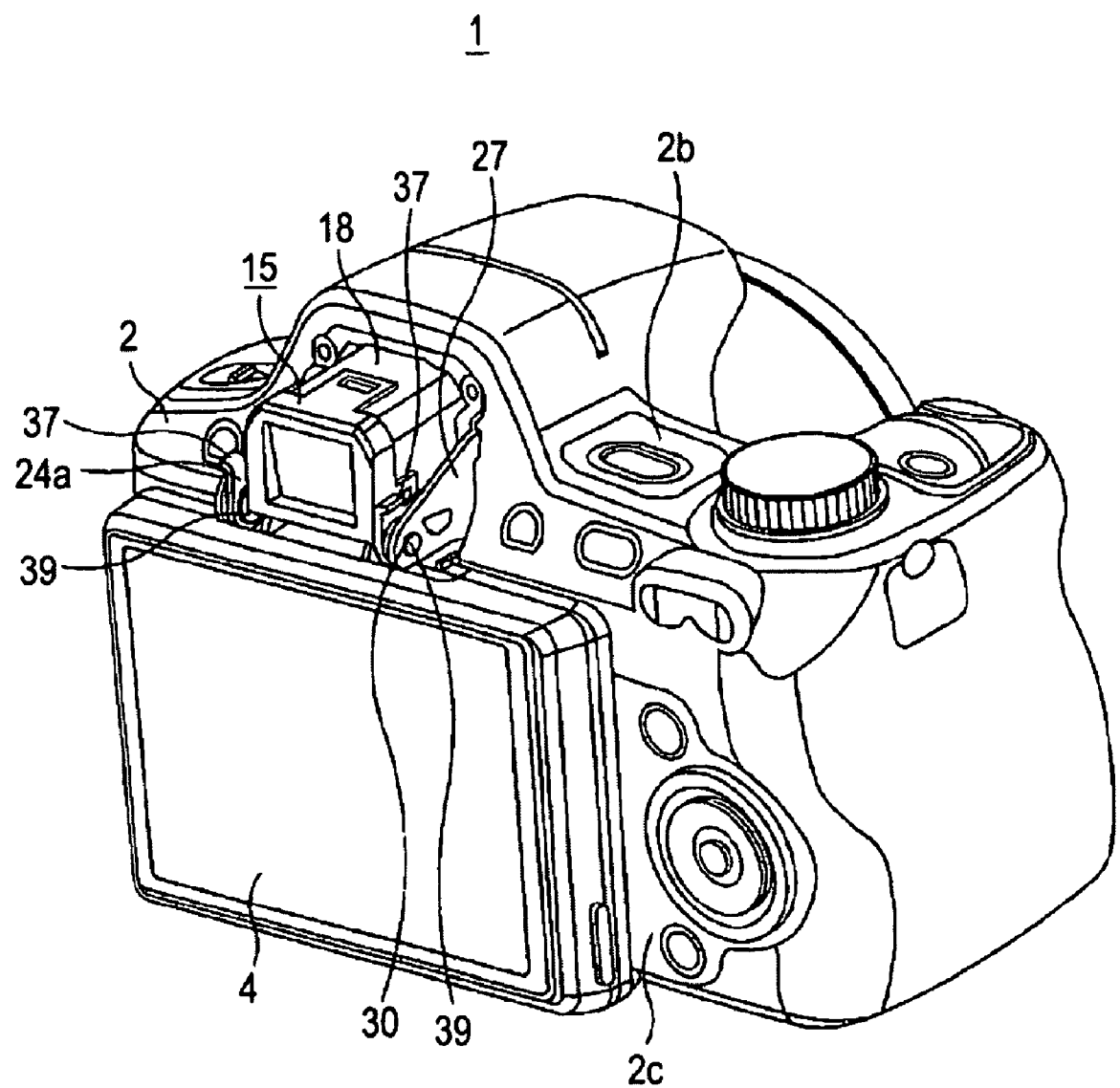
FIG. 2 is a perspective view of the imaging apparatus excluding an eyecup in the normal position in which the liquid crystal monitor is in contact with the back surface of the camera body.
Figure 3:
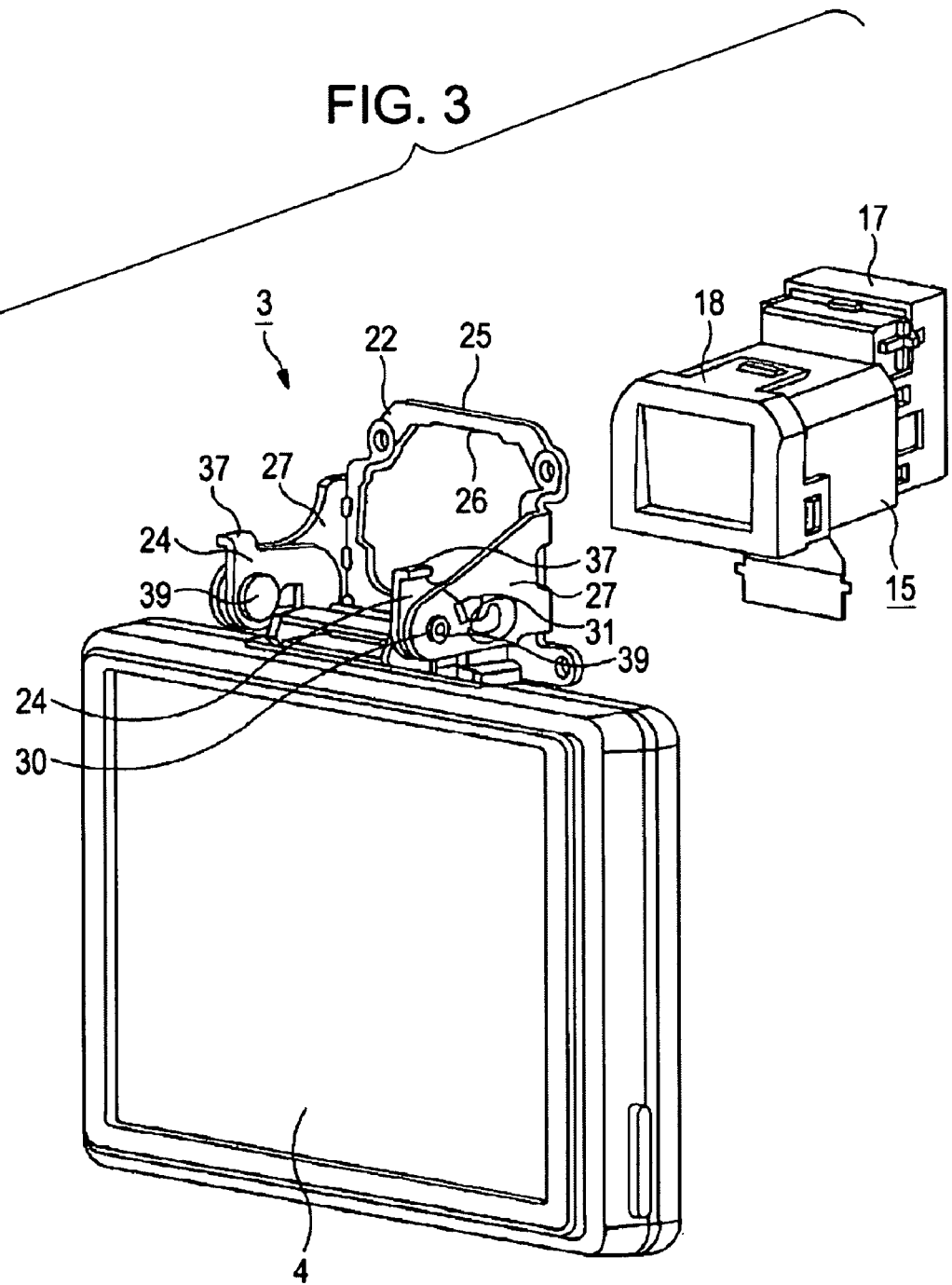
FIG. 3 is a perspective view showing a state in which a viewfinder block is being inserted into a hinge mechanism that supports the liquid crystal monitor.

As shown in FIGS. 2 and 3, the viewfinder block 15 includes an LCD block 17 and a lens block 18 that are joined together. The LCD block 17 includes a liquid crystal panel. The lens block 18 includes a lens unit for viewing an image on the liquid crystal panel. The LCD block 17 is a substantially rectangular tube, which is disposed such that its longitudinal direction corresponds to the height direction of the camera body 2. The lens block 18 is a substantially rectangular tube whose longitudinal direction corresponds to the direction of the optical axis of the lens unit. A lens in the lens block 18 is exposed through the eyecup 16 in a direction toward the back surface 2c of the camera body 2.

As shown FIG. 3, the viewfinder block 15 as a whole is substantially L-shaped, because the liquid crystal panel is disposed in a lower part of the LCD block 17 and the lens block 18 is joined to the lower part of the LCD block 17 such that the lens block 18 faces the liquid crystal panel. The viewfinder block 15 is mounted on the top surface 2b of the camera body 2 such that the LCD block 17 is disposed adjacent to the front surface 2a with its longitudinal direction corresponding to the height direction of the camera body 2, and the lens block 18 is disposed adjacent to the back surface 2c with its longitudinal direction corresponding to the front-back direction of the camera body 2. Since the lens block 18 is mounted on the lower part of the LCD block 17, the height of the eyecup 16 covering the viewfinder block 15, and hence the height of the camera body 2 decrease from the front surface 2a to the back surface 2c.

The lens block 18 is supported by being inserted into a support frame 22 of the hinge mechanism 3 described below and by being engaged with the eyecup 16. The eyecup 16, which covers the viewfinder block 15, is mounted on the back surface 2c of the camera body 2, thereby allowing one end of the lens block 18 to be exposed through an eyepiece recess 29. The eyecup 16 houses the support frame 22 of the hinge mechanism 3. The eyecup 16 has an opening 19 at its bottom, and a support member 23, which is rotatably supported by the support frame 22, extends through the opening 19 (see FIG. 6A). An edge 20 on one side of the opening 19 that is opposite to the back surface 2c of the camera body 2 engages one end of a shield member 50 described below. The edge 20 is rounded along its entire length by chamfering.

The eyecup 16 has, on a side surface 16a, an adjustment dial 28 for adjusting the focus of the lens block 18. The adjustment dial 28 has an adjustment pin, which engages with the lens block 18 contained in the eyecup 16, protruding into the eyecup 16. When a user turns the adjustment dial 28, the adjustment pin moves the lens unit of the lens block 18 along the optical axis so as to focus the lens unit. The eyecup 16 is screwed onto an upper part of the back surface 2c of the camera body 2.

Figure 4:
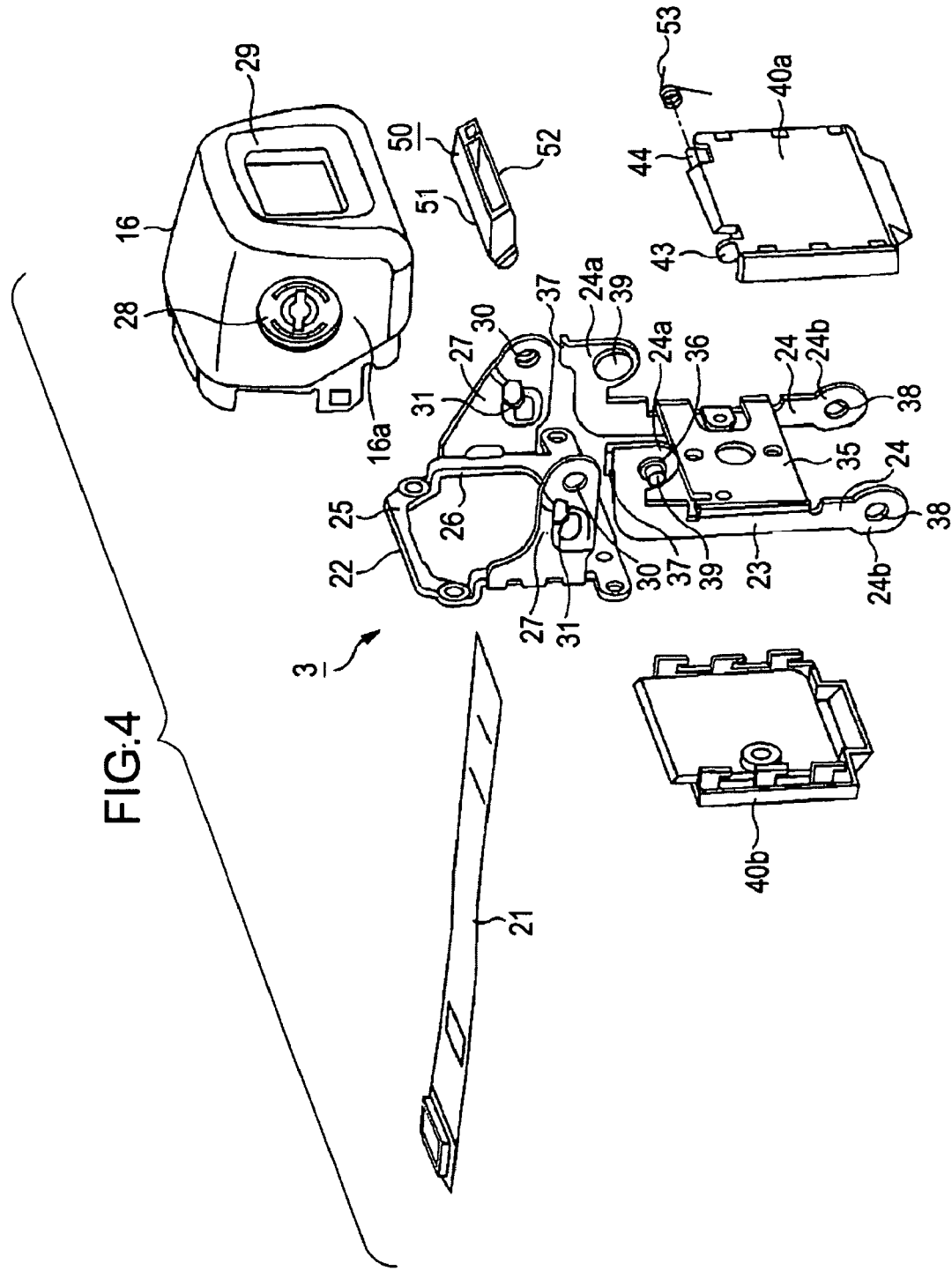
FIG. 4 is an exploded perspective view showing the eyecup, the hinge mechanism, and a shield member.

Next, the hinge mechanism 3 for supporting the liquid crystal monitor 4 is described. As shown in FIG. 4, the hinge mechanism 3 includes the support frame 22 and the support member 23 for supporting the liquid crystal monitor 4. The support frame 22 of the hinge mechanism 3 is mounted on the back surface 2c of the camera body 2. The support frame 22 rotatably supports the support member 23 such that the liquid crystal monitor 4 can be rotated with the hinge mechanism 3. A flexible substrate 21, which connects the camera body 2 and the liquid crystal monitor 4, extends through the hinge mechanism 3 to the liquid crystal monitor 4.

The support frame 22 has a frame body 25, having a rectangular frame shape, with which the support frame 22 is mounted on the camera body 2. The frame body 25 has an insertion hole 26 into which the lens block 18 of the viewfinder block 15 is inserted.

A mounting piece 27 stands on each side of the insertion hole 26 of the frame body 25. A first end 24a of a support arm 24 on each side of the support member 23 for supporting the liquid crystal monitor 4 is mounted on a corresponding mounting piece 27. As shown in FIG. 2, the mounting pieces 27 protrude from the back surface 2c of the camera body 2. Each mounting piece 27 has, in a top end, a support hole 30 for supporting the support arm 24. A mounting hole 36 is drilled in the first end 24a of the support arm 24. The support hole 30 is connected with the mounting hole 36 to provide a continuous hole, and a rivet 39 is inserted into the continuous hole and riveted such that the support arm 24 is rotatably mounted on the mounting piece 27. The mounting piece 27 has a limiting protrusion 31, which limits the rotation range of the support member 23, between the bottom end near the frame body 25 and the top end. The limiting protrusion 31 is configured to engage with an engaging piece 37 formed on the first end 24a of the support arm 24. By this engagement, the limiting protrusion 31 limits the rotation of the liquid crystal monitor 4, which is supported on the support member 23, toward the top surface 2b of the camera body 2 to a certain extent.

The length in the height direction of the mounting piece 27 becomes gradually narrower from the bottom end adjacent to the frame body 25 to the top end. As a result of having a larger width at the bottom end, the mounting piece 27 is resistant to a pressure from the left-right direction.

The support member 23, which is supported by the mounting piece 27, includes the support arms 24 and a connecting plate portion 35 between the support arms 24. The support arms 24 and the connecting plate portion 35 are integrally formed. Each support arm 24 has the mounting hole 36 and the engaging piece 37 at the first end 24a, and a pivot hole 38 at a second end 24b. The mounting hole 36 is rotatably connected to the mounting piece 27. The engaging piece 37 engages with the limiting protrusion 31. The pivot hole 38 is connected to a support base 62 of the liquid crystal monitor 4. The mounting hole 36 of the support arm 24 and the support hole 30 of the mounting piece 27 are aligned so as to be continuous and then riveted with the rivet 39. The liquid crystal monitor 4 is rotatably mounted on the support arm 24 by connecting and then riveting the pivot hole 38 to a support section formed on a panel casing 60 and the support base 62 of the liquid crystal monitor 4.

The hinge mechanism 3 has a friction disc disposed between the support hole 30 in the support arm 24 and the mounting hole 36 in the mounting piece 27, and a friction disc is disposed between the pivot hole 38 of the support arm 24 and the support base 62 of the liquid crystal monitor 4. Therefore, the support arms 24 can be held at a desired rotated position relative to the support frame 22, and the liquid crystal monitor 4 can be held at a desired rotated position relative to the support arms 24.

Figure 5A:
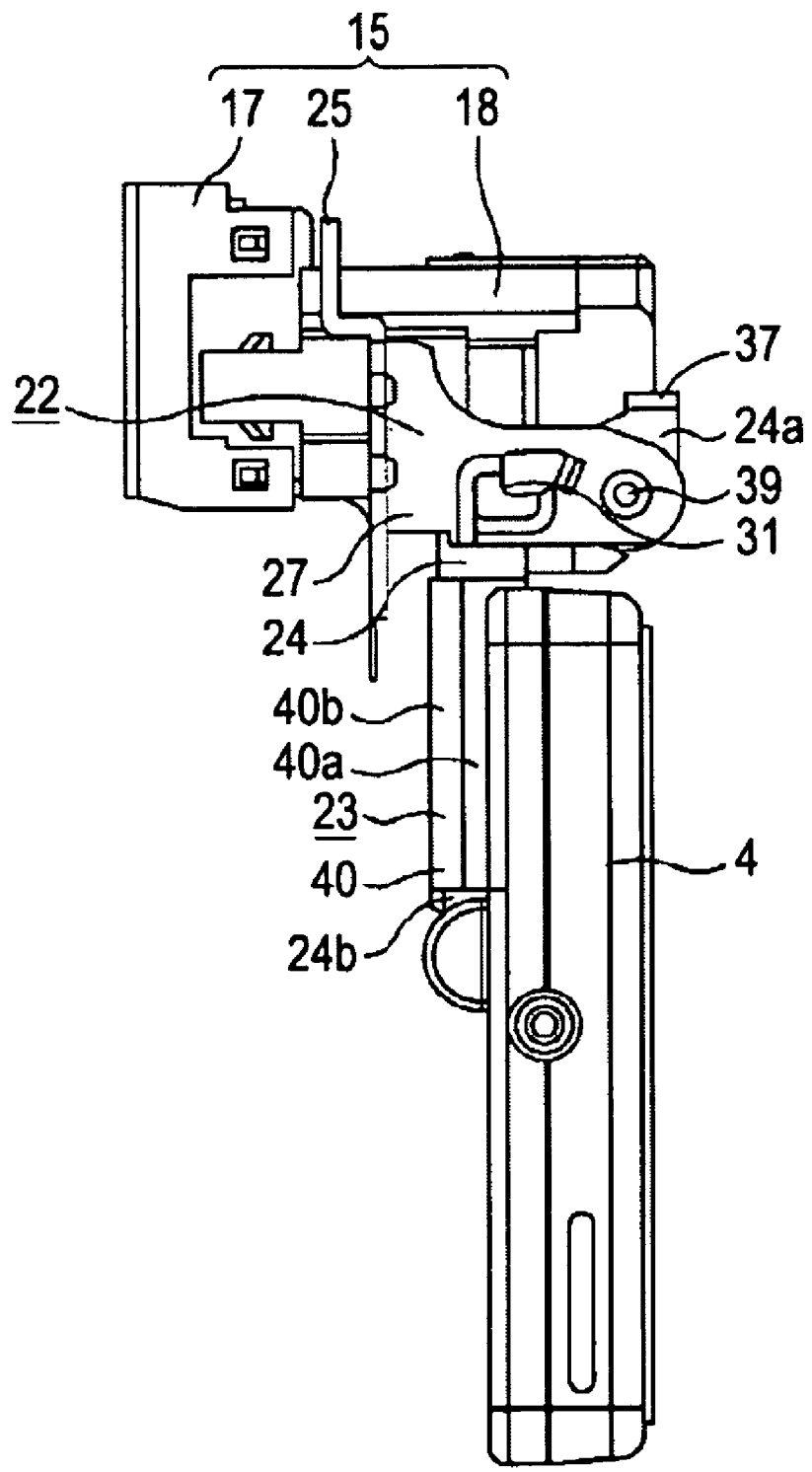
FIG. 5A is a side view showing the hinge mechanism in the normal position.
Figure 5B:
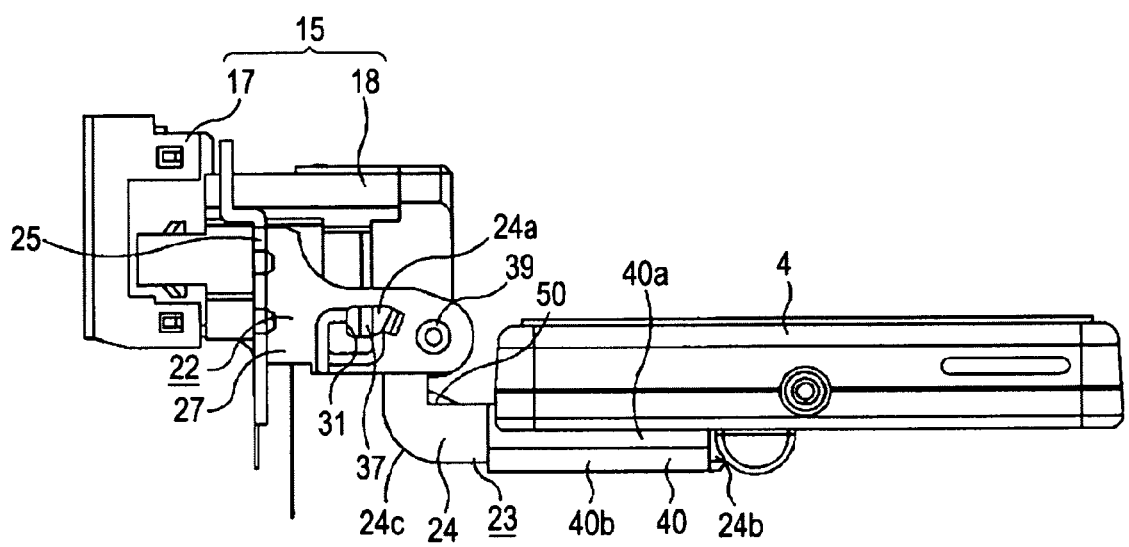
FIG. 5B is a side view showing the hinge mechanism in a position in which the support arm is rotated by substantially 90 degrees from the normal position.
Figure 5C:
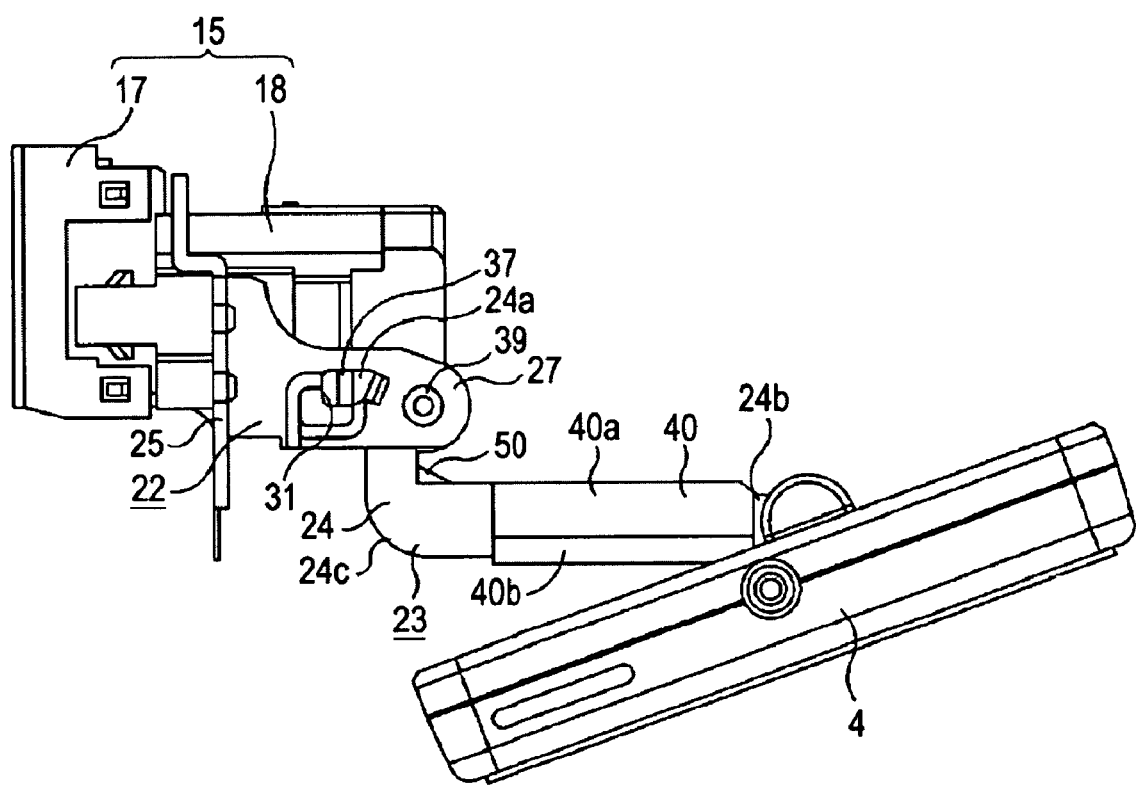
FIG. 5C is a side view showing the hinge mechanism in a position in which the liquid crystal monitor is rotated by substantially 180 degrees from the position shown in FIG. 5B.

With such a structure, the hinge mechanism 3 can be moved between a normal position and a rotated position. As shown in FIG. 5A, in the normal position, the longitudinal side of the support arm 24 of the support member 23 is oriented downward and the liquid crystal monitor 4 is in contact with the back surface 2c of the camera body 2. As shown in FIG. 5B, in the rotated position, the longitudinal side of the support arm 24 of the support member 23 is rotated upward substantially at an angle of 90 degrees and the liquid crystal monitor 4 is separated from the back surface 2c of the camera body 2. Moreover, as shown in FIGS. 5B and 5C, with the hinge mechanism 3, the liquid crystal monitor 4 can be rotated through substantially 180 degrees about the rivet inserted into the pivot hole 38 of the support arm 24. Therefore, a user of the imaging apparatus 1 can rotate the liquid crystal monitor 4 so that the liquid crystal monitor 4 faces the user even if the user is in a position in which it is difficult for the user to face the liquid crystal monitor 4 in the normal position, thereby maintaining viewability.

Each support arm 24 includes a bent portion 24c at which the first end 24a side is bent at a right angle. At the bent portion 24c, the support arm 24 is divided into a shorter side including the first end 24a and a longer side including the second end 24b. The connecting plate portion 35 is disposed on the longer side. With the hinge mechanism 3, since the support arm 24 has the bent portion 24c, the liquid crystal monitor 4 is retracted to the back surface 2c of the camera body 2 such that the liquid crystal monitor 4 is located right below the first end 24a of the support arm 24.

A hinge cover 40 is attached to the connecting plate portion 35. The hinge cover 40 prevents the flexible substrate 21 from being exposed near the longer side of the support arm 24. The hinge cover 40 includes a back cover 40a that is attached from near the back surface 2c of the camera body 2 and a front cover 40b that is attached from near the liquid crystal monitor 4. The back cover 40a and the front cover 40b are joined together so as to cover the connecting plate portion 35, thereby providing a space into which the flexible substrate 21 is to be inserted and preventing the flexible substrate 21 from being exposed to the outside.

The hinge cover 40 has an engagement support section 43 on an edge near the first end 24a of the support arm 24. The engagement support section 43 engages and supports the shield member 50 that covers the flexible substrate 21 and secures one end of a torsion coil spring 53 described below. The shield member 50 prevents the flexible substrate 21 from being exposed near the bent portion 24c of the support frame 22 when the support member 23 is rotated. The shield member 50 is rotatably engaged with one end of the front cover 40b. The engagement support section 43 includes a journal portion for supporting a spindle 44 into which a bearing portion of the shield member 50 is inserted so as to rotatably support one end of the shield member 50.

Next, the shield member 50 that is engaged with the hinge cover 40 is described. The shield member 50 has a substantially rectangular duct-like shape. The shield member 50 shields the flexible substrate 21 from the outside between the eyecup 16 and the hinge cover 40. The length of the shield member 50 in a longitudinal direction is a little smaller than the distance between the support arms 24. The length of the shield member 50 in a transversal direction perpendicular to the longitudinal direction is greater than the distance between the engagement support section 43 of the hinge cover 40 and the edge 20 of the opening 19 of the eyecup 16.

Figure 6A:
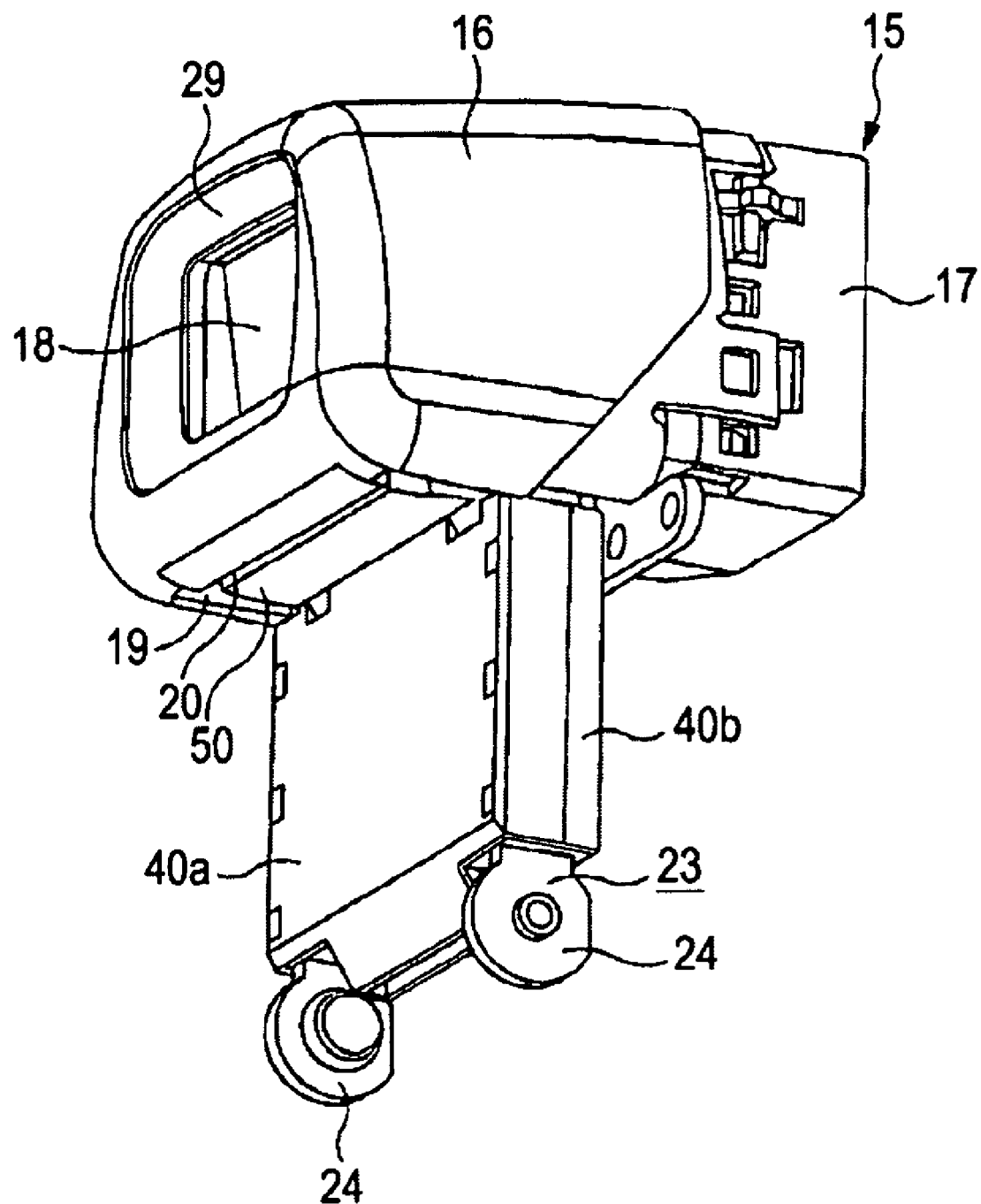
FIG. 6A is a perspective view showing the hinge mechanism in the normal position.
Figure 6B:
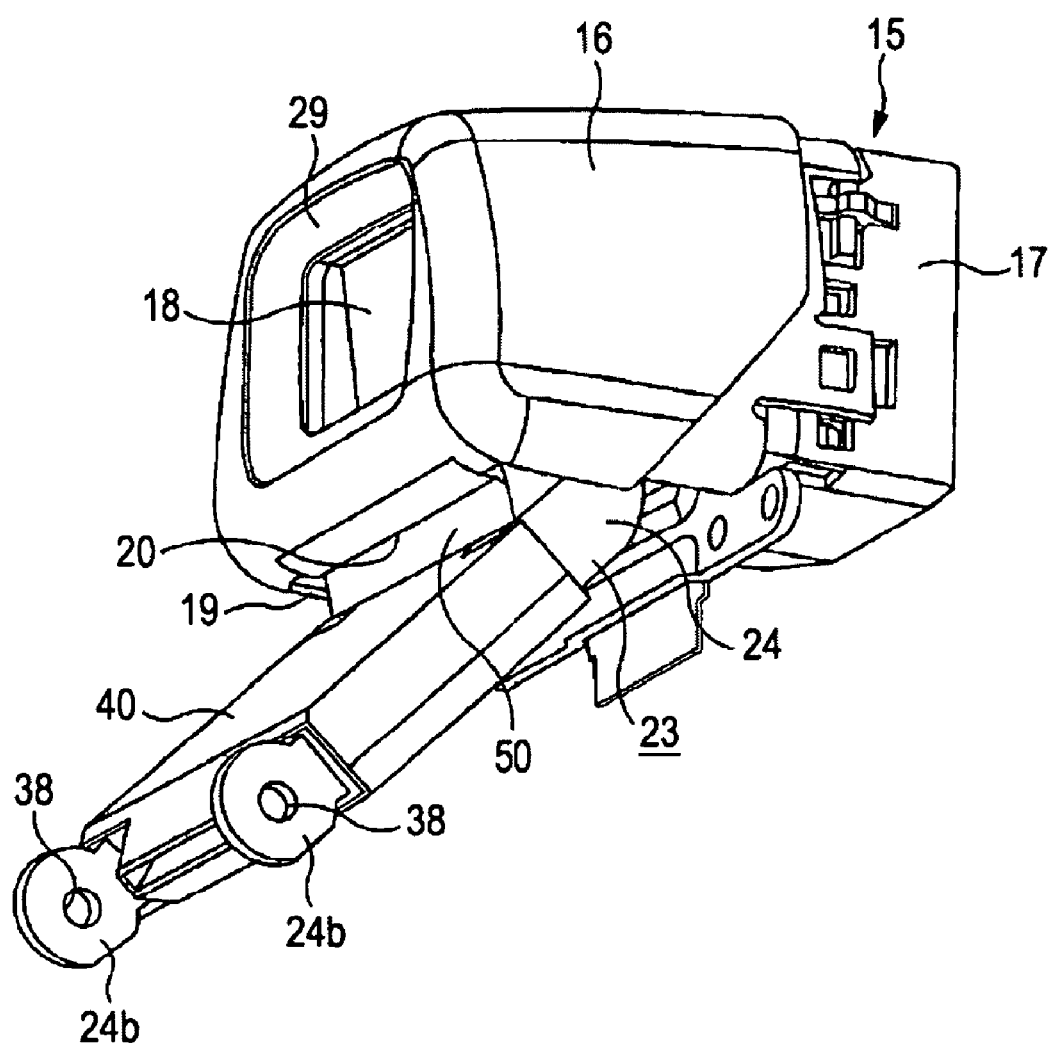
FIG. 6B is a perspective view showing the hinge mechanism in a position rotated by substantially 45 degrees from the normal position.
Figure 6C:
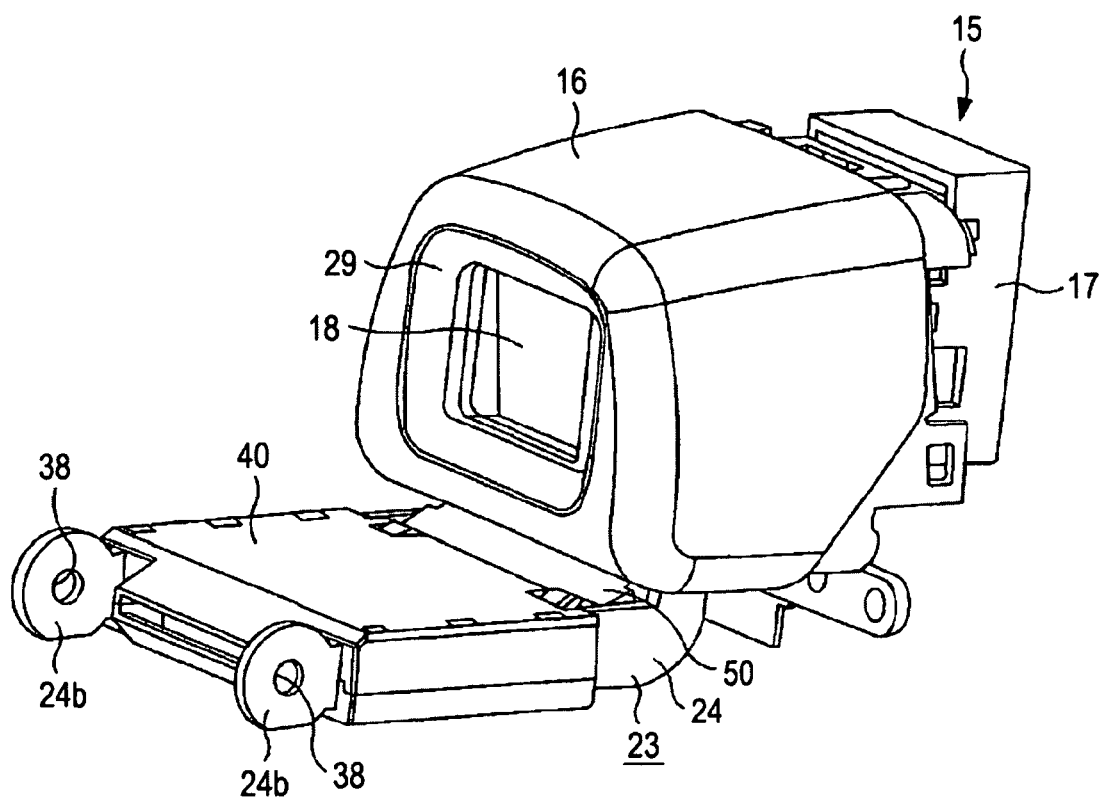
FIG. 6C is a perspective view showing the hinge mechanism in a position rotated by substantially 90 degrees from the normal position.

The shield member 50 has the bearing portion on a longitudinal side 51 disposed in a transversal end thereof. The shield member 50 is rotatably supported on the spindle 44 that is supported by the engagement support section 43 of the hinge cover 40 and inserted into the bearing portion. Another longitudinal side 52 of the shield member 50 disposed in the other transversal end thereof is engaged with the edge 20 of the opening 19 of the eyecup 16. Thus, as shown in FIGS. 6A to 6C, the hinge mechanism 3 extends continuously through the eyecup 16, the shield member 50, and the hinge cover 40. When the support member 23 rotates relative to the support frame 22, the longitudinal side 51 of the shield member 50 engaged with the hinge cover 40 rotates with the support member 23, and the longitudinal side 52 engaged with the edge 20 of the eyecup 16 slides along the edge 20.

Figure 7A:
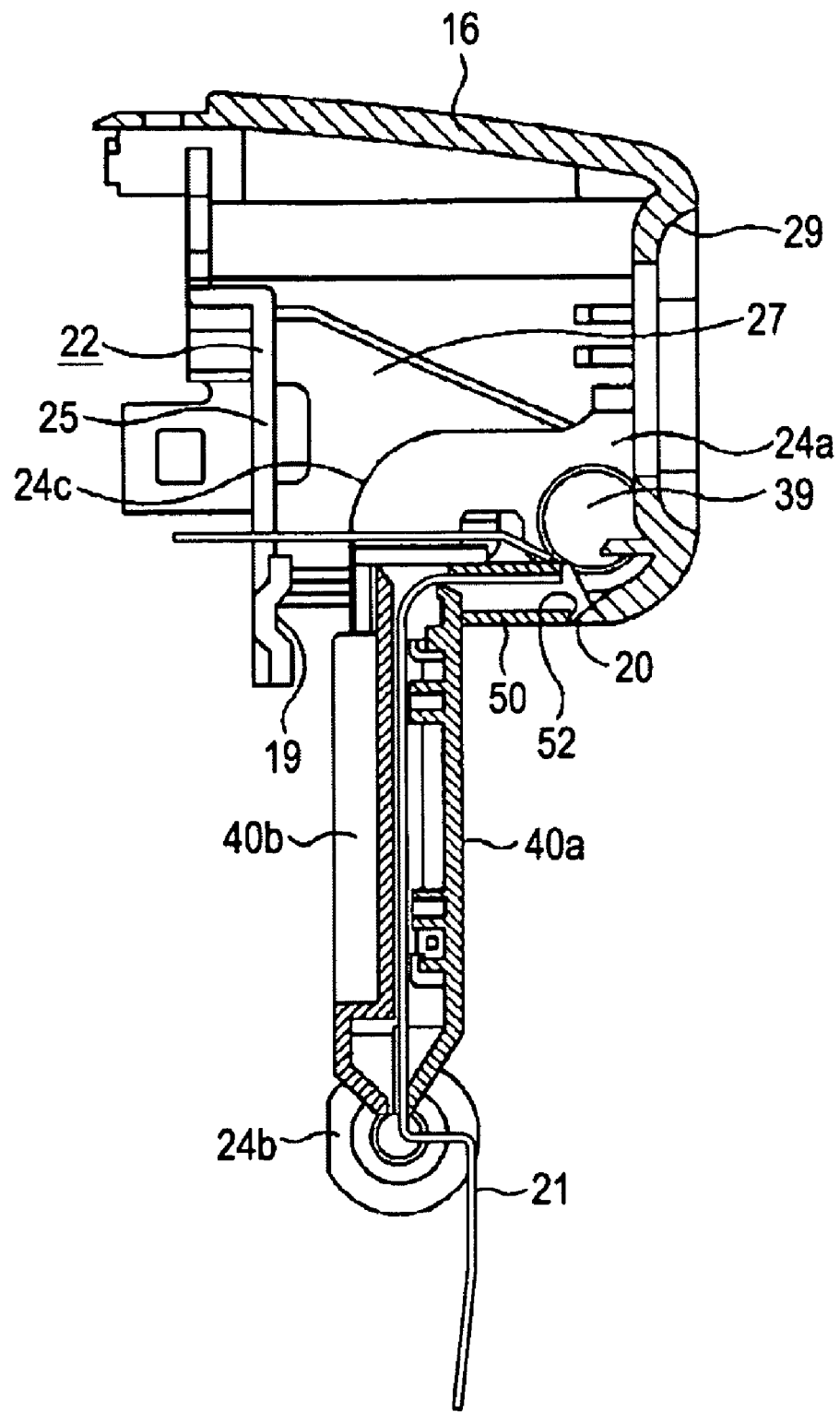
FIG. 7A is a sectional view showing the hinge mechanism and the shield member in the normal position, and an area through which a flexible substrate extends.

The shield member 50 has open ends at the longitudinal sides 51 and 52 disposed in the transversal direction so that the flexible substrate 21 is inserted into the openings. As shown in FIG. 7A, the hinge mechanism 3 extends continuously through the opening 19 of the eyecup 16, the inner space of the shield member 50, and the inner space of the hinge cover 40. Moreover, the flexible substrate 21 extends through the opening 19 of the eyecup 16, the inner space of the shield member 50, and the inner space of the hinge cover 40 to the liquid crystal monitor 4. Therefore, with the imaging apparatus 1, the flexible substrate 21, which extends from the back surface 2c of the camera body 2 to the liquid crystal monitor 4, is not exposed to the outside, thereby preventing breakage and adherence of dust, water droplets, or the like.

The longitudinal side 51 disposed in the transversal end of the shield member 50 is engaged with and supported by the hinge cover 40. The torsion coil spring 53 is engaged with the edge of the longitudinal side 51. The torsion coil spring 53 rotationally urges the shield member 50 continuously in a direction around the spindle 44 that is rotatably supported by the engagement support section 43 of the hinge cover 40, thereby preventing creation of a gap between the opening 19 of the eyecup 16 and the shield member 50.

Figure 7B:
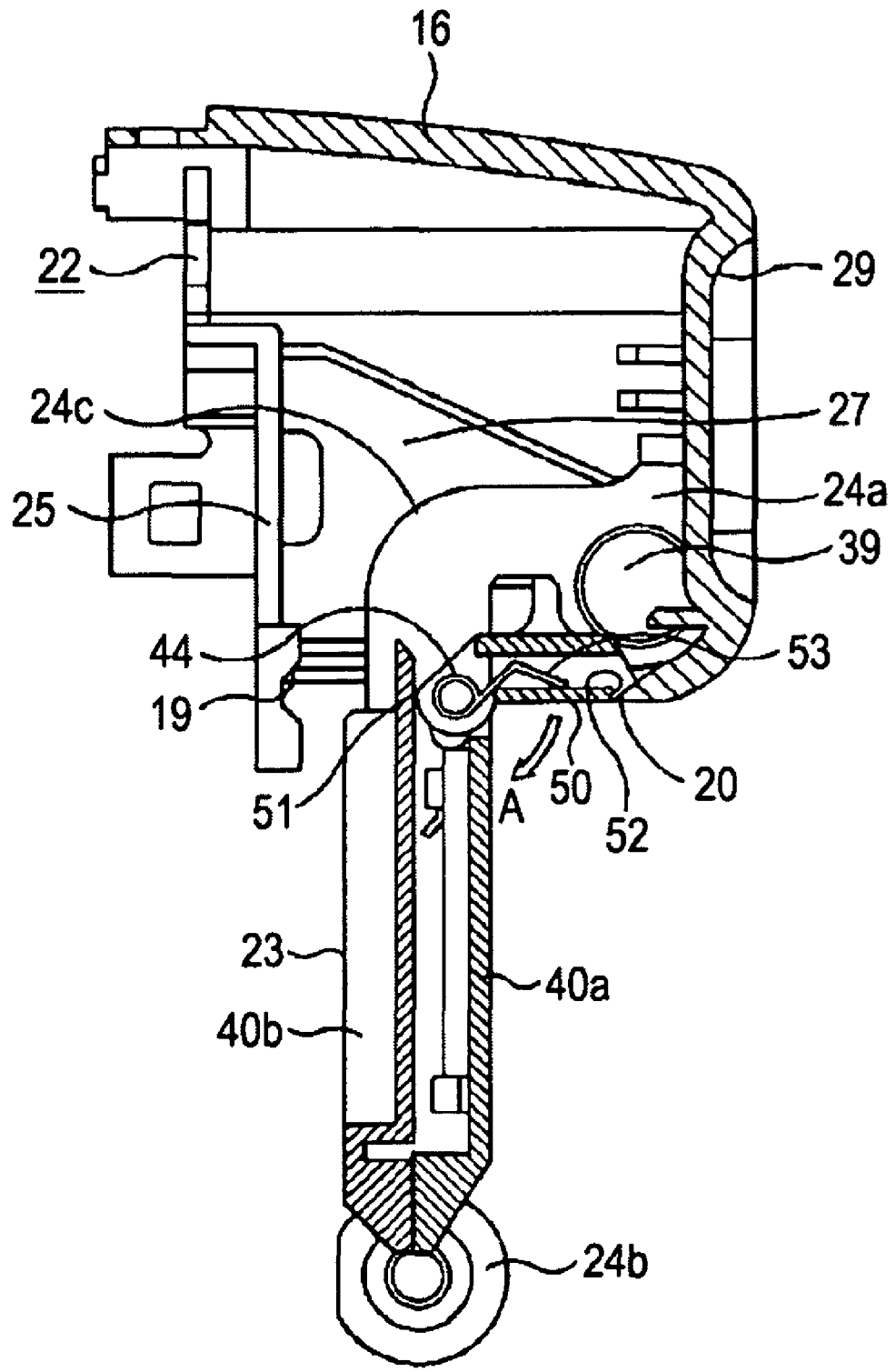
FIG. 7B is a sectional view showing the hinge mechanism and the shield member in the normal position, and an area where a torsion coil spring is engaged.

Specifically, as shown in FIG. 7B, the torsion coil spring 53 has a ring-shaped portion that is inserted into the spindle 44. One end of the torsion coil spring 53 is in contact with the inner space of the shield member 50, and the other end of the torsion coil spring 53 is engaged with the engagement support section 43 in the front cover 40b of the hinge cover 40. Thus, the torsion coil spring 53 rotatably urges the longitudinal side 52 of the shield member 50 in the direction of arrow A shown in FIG. 7B so that the longitudinal side 52 contacts the edge 20 of the opening 19 of the eyecup 16.

Figure 8A:
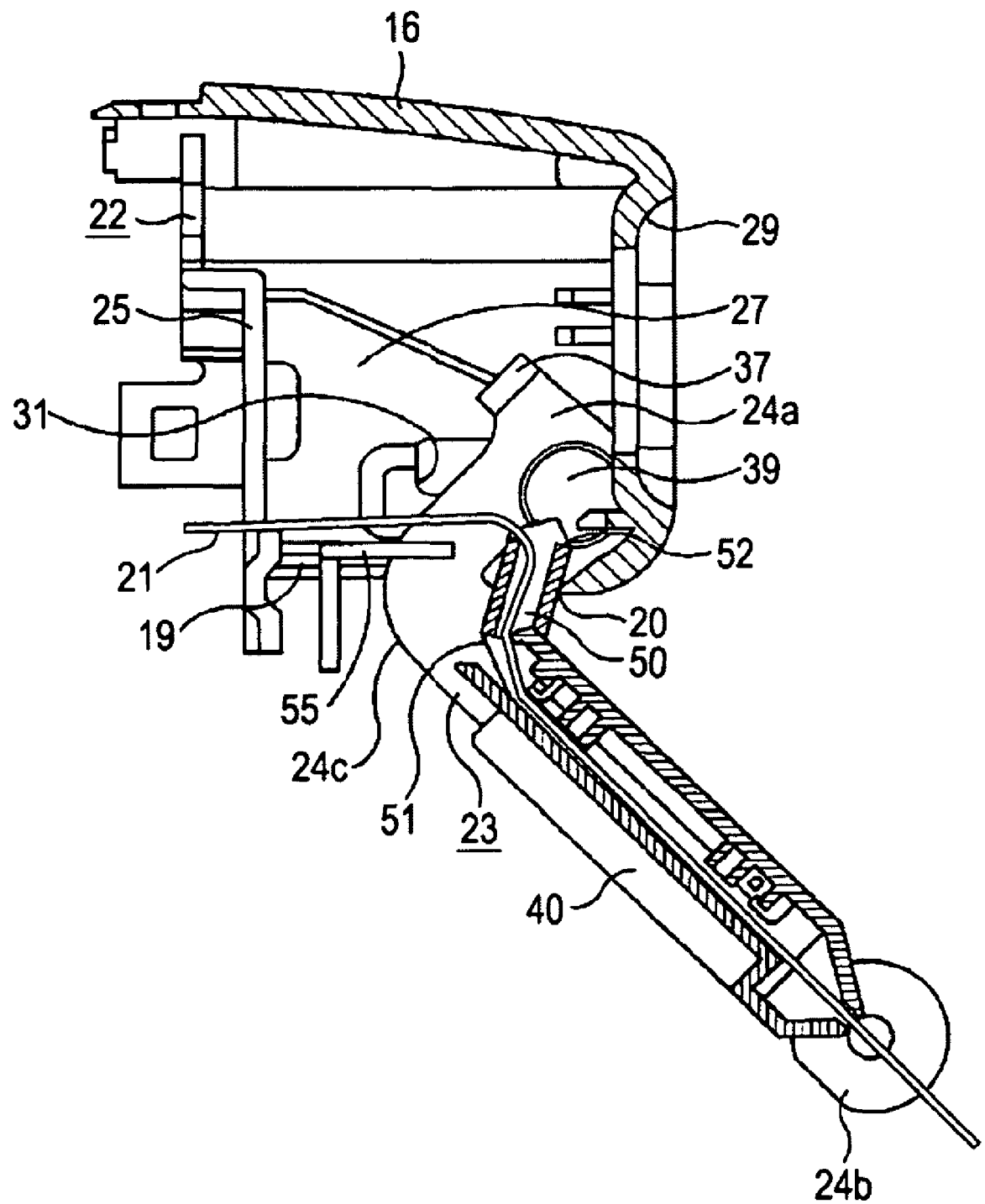
FIG. 8A is a sectional view showing the hinge mechanism and the shield member in a position in which the support member is rotated by substantially 45 degrees from the normal position, and the area through which the flexible substrate extends.
Figure 8B:
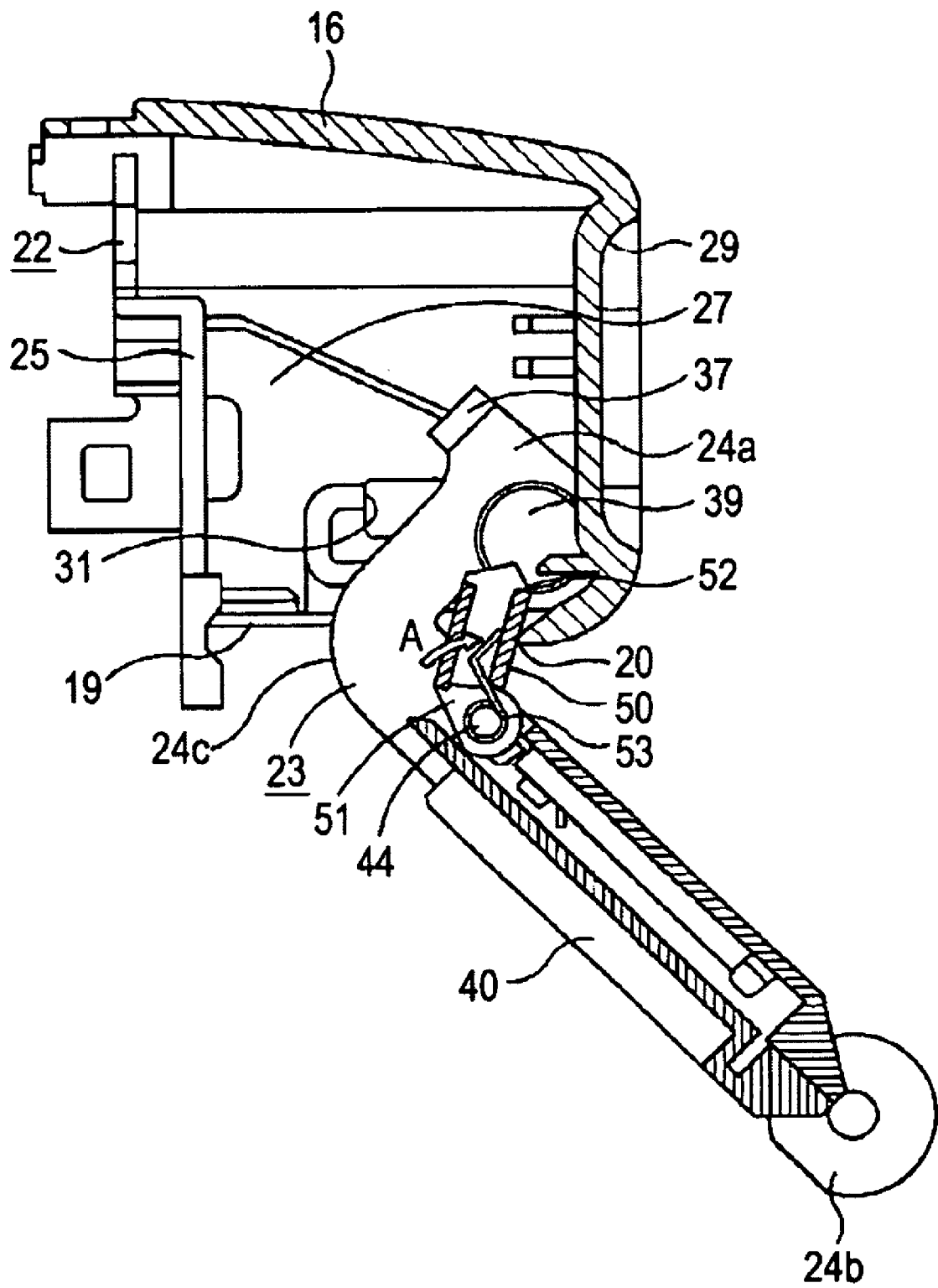
FIG. 8B is a sectional view showing the hinge mechanism and the shield member in a position in which the support member is rotated by substantially 45 degrees from the normal position, and the area where the torsion coil spring is engaged.

With the torsion coil spring 53, which rotationally urges the shield member 50, when the support member 23 is rotated from the downward position shown in FIG. 7A by substantially 45 degrees to the position shown in FIG. 8A, the longitudinal side 52 of the shield member 50 slidably contacts the edge 20 of the opening 19 of the eyecup 16 as shown in FIG. 8B. Moreover, when the support member 23 is rotated from the downward position shown in FIG. 7A by substantially 90 degrees to the position shown in FIG. 9A, the longitudinal side 52 of the shield member 50 slidably contacts the edge 20 of the opening 19 of the eyecup 16 as shown in FIG. 9B. Thus, with the hinge mechanism 3, a gap does not appear between the shield member 50 and the opening 19 of the eyecup 16. Therefore, with the hinge mechanism 3, at any rotated position of the support member 23, the flexible substrate 21 is not exposed between the shield member 50 and the opening 19 of the eyecup 16 and is assuredly shielded. Similarly, when the support member 23 is returned from the position shown in FIG. 9 to the position shown in FIG. 7, a gap does not appear between the shield member 50 and the opening 19 of the eyecup 16.

The hinge mechanism 3 includes the support arm 24 having the bent portion 24c to which the hinge cover 40 is not easily attached. The vicinity of the bent portion 24c tends to be exposed when the support member 23 is rotated. However, by disposing the shield member 50 that covers the bent portion 24c, the flexible substrate 21 is assuredly shielded.

As shown in FIGS. 8A to 9B, a cover plate 55 is provided on the back surface 2c of the camera body 2. The cover plate 55 juts into the opening 19 of the eyecup 16. The cover plate 55 shields a part of the flexible substrate 21, which is disposed between the camera body 2 and the support arms 24 of the support member 23, from below the camera body 2, when the liquid crystal monitor 4 is rotated toward the top surface 2b of the camera body 2. The cover plate 55 juts out between the support arms 24 when the support frame 22 is mounted on the back surface 2c of the camera body 2 so that the flexible substrate 21 is disposed between the viewfinder block 15 and the bottom surface of the lens block 18.

Figure 10A:
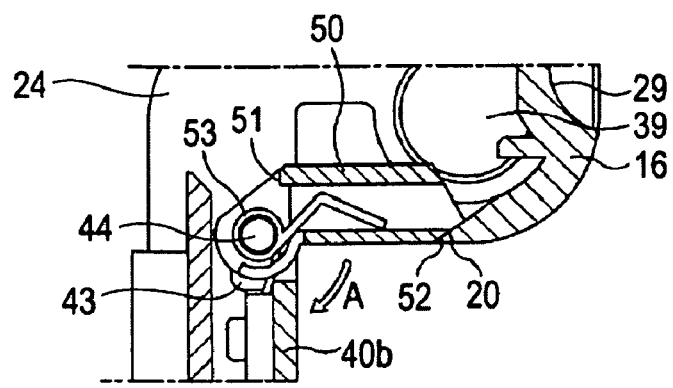
FIG. 10A is a sectional view of an edge of the eyecup on which the shield member slides, when the hinge mechanism is in the normal position.
Figure 10B:
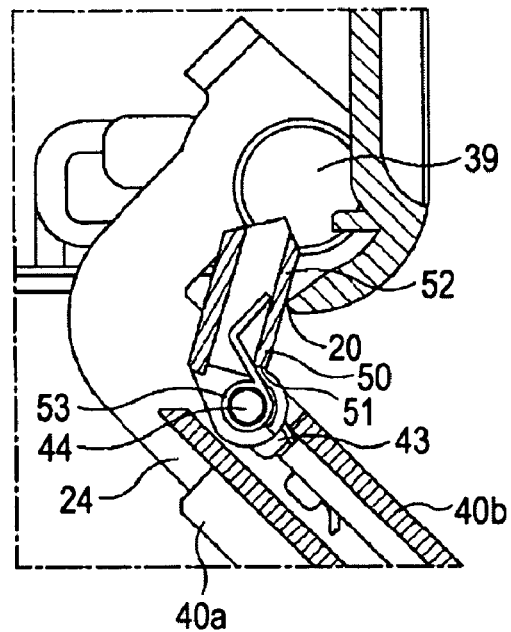
FIG. 10B is a sectional view of the edge of the eyecup when the support member is rotated by substantially 45 degrees from the normal position.
Figure 10C:
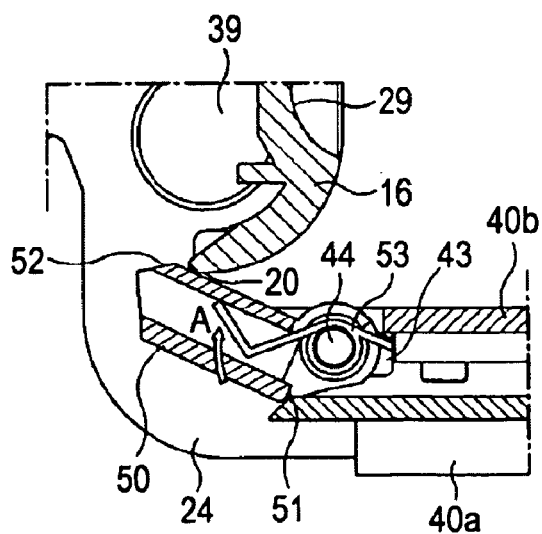
FIG. 10C is a sectional view of the edge of the eyecup when the support member is rotated by substantially 90 degrees from the normal position.

As shown in FIGS. 10A to 10C, the shield member 50 slides smoothly because the edge 20 of the opening 19 of the eyecup 16, to which the longitudinal side 52 of the shield member 50 is slidably in contact with, is chamfered in a rounded shape. That is, the surface of the edge 20 with which the longitudinal side 52 of the shield member 50 is in contact is chamfered in a direction in which the shield member 50 rotates. The shield member 50, whose longitudinal side 52 is urged toward the edge 20, slides to-and-fro on a certain path while contacting the edge 20 for any rotation of the liquid crystal monitor. Since the edge 20 of the opening 19 of the eyecup 16 is chamfered in a rounded shape, the shield member 50 stably slides along the edge 20. Thus, with the hinge mechanism 3, a sliding noise or wobbling of the shield member 50 is prevented for any rotation of the liquid crystal monitor 4.

Figure 11:
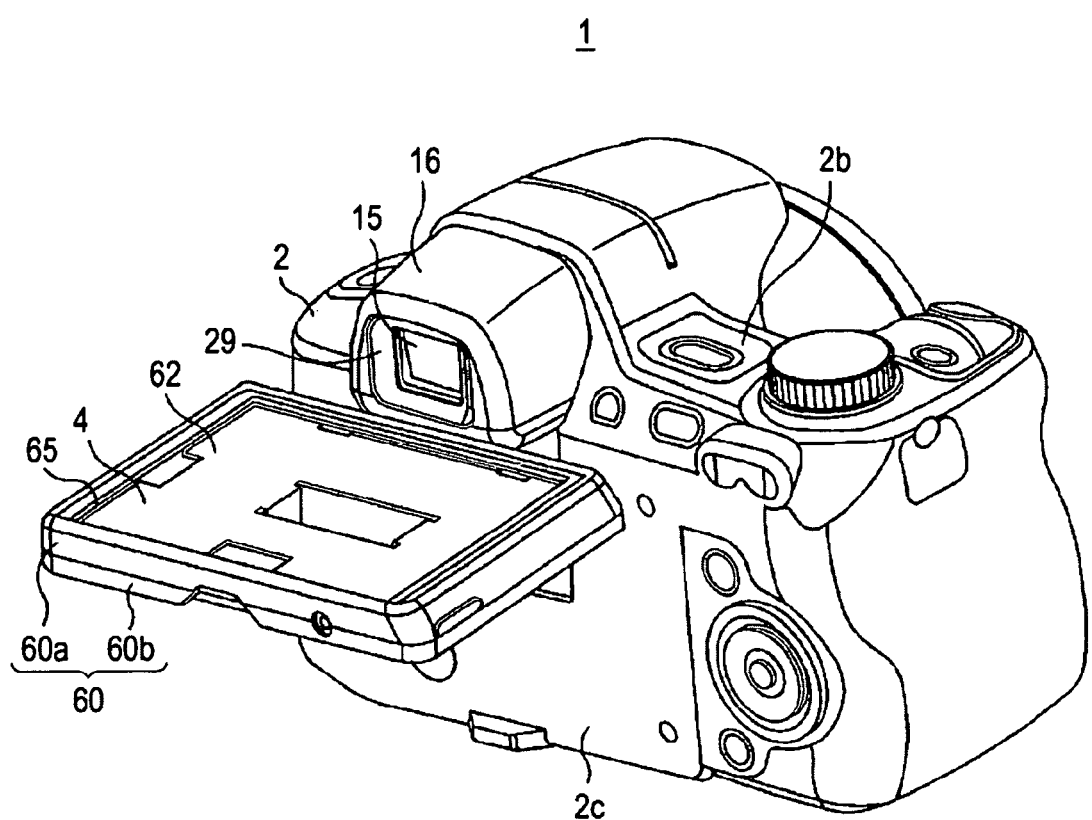
FIG. 11 is a perspective view showing the imaging apparatus when the liquid crystal monitor is rotated by substantially 90 degrees from the normal position.

Next, the liquid crystal monitor 4, which is rotatably supported by the camera body 2 with the hinge mechanism 3, is described. As shown in FIG. 11, the liquid crystal monitor 4 includes the panel casing 60 having a substantially rectangular parallelepiped shape. The panel casing 60 contains a liquid crystal module (not shown) and the support base 62 to which the support arms 24 of the hinge mechanism 3 are connected.

Figure 12A:
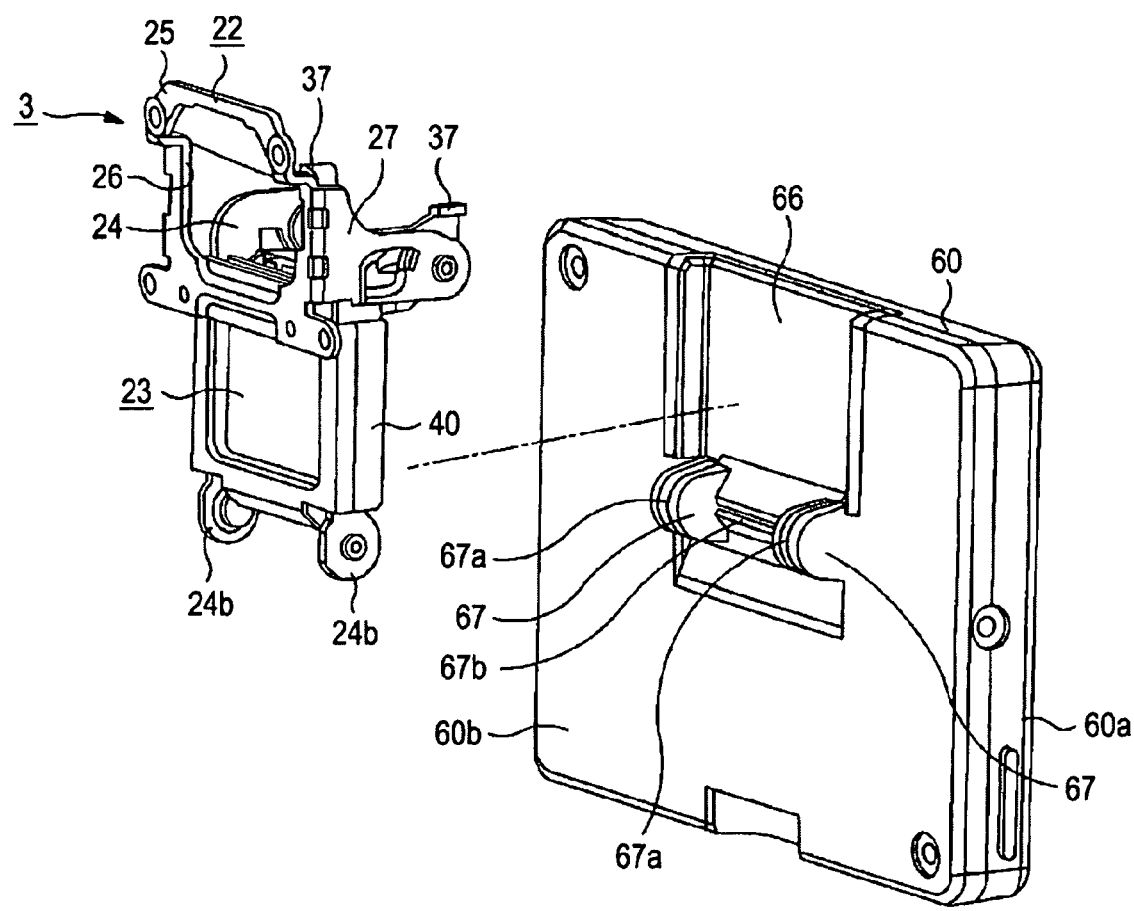
FIG. 12A is a rear perspective view of the liquid crystal monitor when the monitor is not mounted on the hinge mechanism.

The panel casing 60 includes a front half 60a and a back half 60b that are joined so as to face each other. The front half 60a includes a rectangular window portion 65 through which the liquid crystal module (not shown) is exposed to the outside. As shown in FIG. 12A, the back half 60b has a rectangular recess 66 into which the support member 23 of the hinge mechanism 3 enters.

The recess 66 is disposed in the upper part of the back half 60b above the substantial center of the back half 60b. The recess 66 has a sufficient width for the support member 23 with the hinge cover 40 to be fitted into the recess 66. A rotation support section 67 is disposed on each side of the lower part of the recess 66. The second end 24b of the support arm 24 is inserted into and rotatably supported by the corresponding rotation support section 67. Each rotation support section 67 includes a slit 67a and an insertion opening 67b. The second end 24b of each support arm 24 is inserted into the corresponding slit 67a. The flexible substrate 21 extending out of the hinge cover 40 is inserted into the insertion opening 67b, which is exposed between the slits 67a.

Figure 12B:
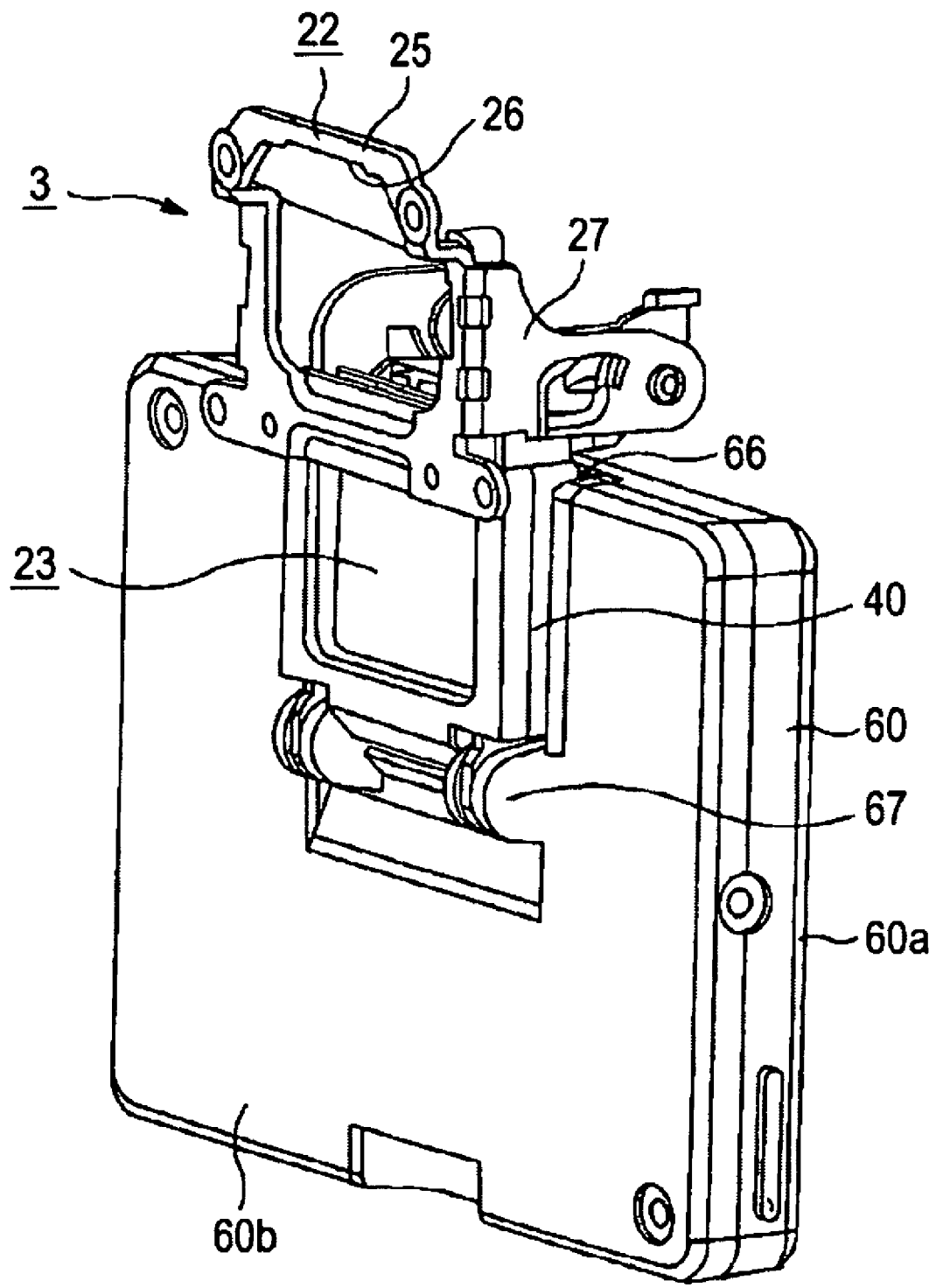
FIG. 12B is a rear perspective view of the liquid crystal monitor when the hinge mechanism is fitted into a recess.
Figure 13:
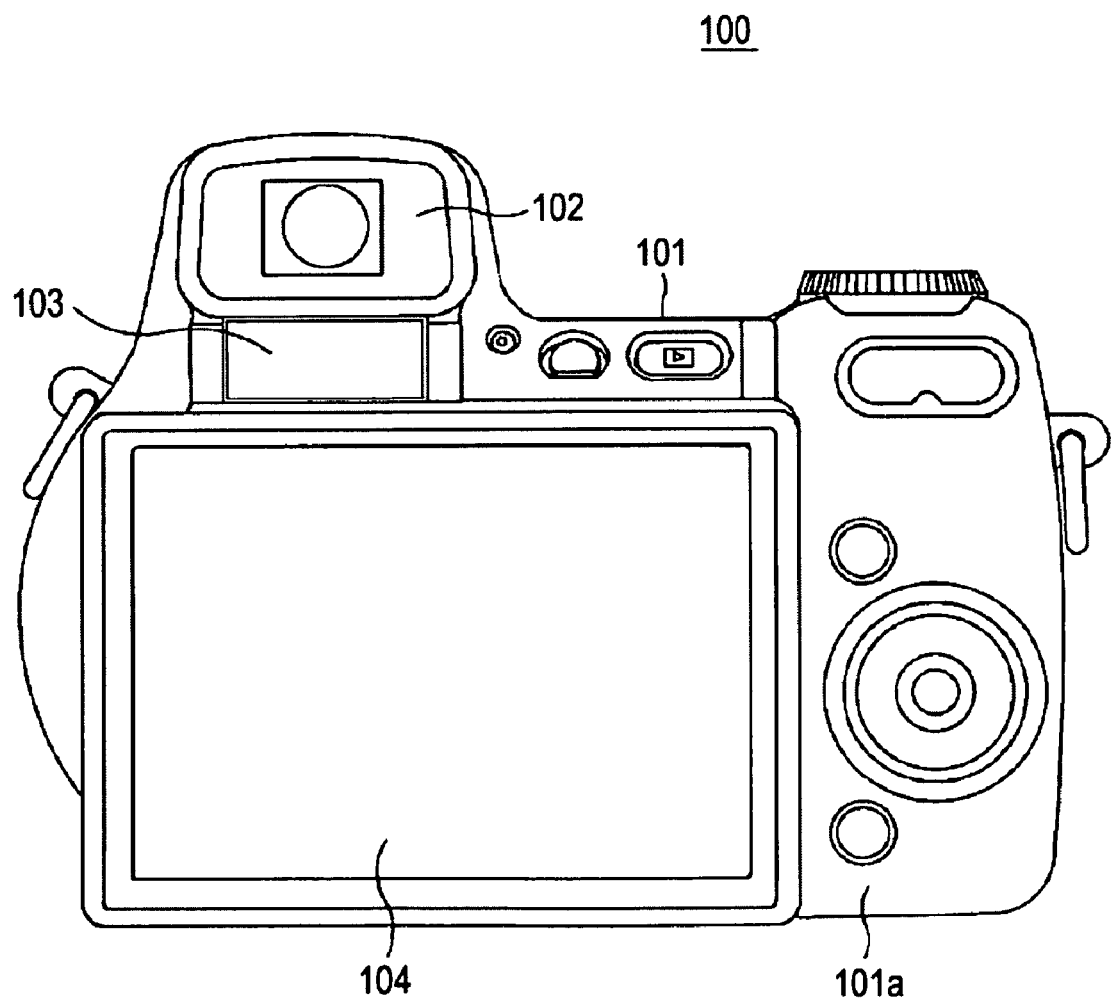
FIG. 13 is a rear view of an imaging apparatus of the related art.

As shown in FIG. 12B, with the recess 66, the panel casing 60 is rotatably connected to the pivot holes 38 of the second ends 24b of the support arms 24 at the slits 67a of the rotation support section 67. Moreover, the flexible substrate 21 extending through the hinge cover 40 of the hinge mechanism 3 is inserted into the insertion opening 67b and connected to the liquid crystal module (not shown) in the panel casing 60.

When the panel casing 60 is rotated about the rotation support section 67 supported by the support member 23, the hinge cover 40 attached to the support member 23 fits into the recess 66. Therefore, when the liquid crystal monitor 4 is in the normal position in which the liquid crystal monitor 4 is in contact with the back surface 2c of the camera body 2, the hinge cover 40 of the hinge mechanism 3 fits into the recess 66 of the panel casing 60. The panel casing 60 of such a type serves to reduce the thickness of the camera body 2 and prevents the wobbling of the liquid crystal monitor 4 in the normal position by allowing the back half 60b to closely contact the back surface 2c of the camera body 2.

In the imaging apparatus 1, when the liquid crystal monitor 4 is in the normal position in which the liquid crystal monitor 4 is rotated toward the back surface 2c of the camera body 2, the first ends 24a of the support arms 24 of the hinge mechanism 3 are located right above the panel casing 60, and the support frame 22 that supports the first ends 24a of the support arms 24 is covered with the eyecup 16. That is, as described above, in the hinge mechanism 3, the frame body 25 of the support frame 22 has the insertion hole 26 into which the lens block 18 of the viewfinder block 15 is inserted. The frame body 25 also has the mounting pieces 27, which support the support arms 24, standing on the sides of the insertion hole 26. As shown in FIGS. 1 and 2, in the hinge mechanism 3, since the support arms 24 of the support member 23 for supporting the liquid crystal monitor 4 are disposed at substantially the same height as the viewfinder block 15, the viewfinder block 15 is at substantially the same height as the hinge mechanism 3, and the liquid crystal monitor 4 is disposed right below the viewfinder block 15.

The imaging apparatus 1 is thus provided with a low profile as compared with an imaging apparatus that has the viewfinder block 15, the hinge mechanism 3 and the liquid crystal monitor 4 aligned in the height direction. This low-profile serves to increase portability and an aesthetic property in design. Moreover, the liquid crystal monitor 4 having a large area can be mounted so as to increase viewability without increasing the height of the camera body 2.

Heretofore, the imaging apparatus according to an embodiment of the present invention has been described. The present invention is applicable not only to the imaging apparatus 1 including the electronic viewfinder 10, but also to an imaging apparatus including an optical viewfinder (OVF). The present invention is applicable not only to the imaging apparatus 1 including the liquid crystal monitor 4, but also to an imaging apparatus including any display monitor such as an organic electroluminescent display.

The present invention is applicable not only to a digital camera and a film camera, but also to a video camera that has a monitor rotatably supported by the apparatus body. The hinge mechanism according to an embodiment of the present invention is applicable to any electronic appliance such as a cellular phone or a laptop PC.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
    an apparatus body;
    a monitor connected to the apparatus body; and
    a hinge mechanism including
        a support member including a pair of support arms each having a mounting portion at one end and a supporting portion at the other end, the mounting portion of each of the support arms being rotatably mounted on the apparatus body and the supporting portion of each of the support arms including a mounting hole configured to rotatably support the monitor relative to the apparatus body; and
        a frame fixed to the apparatus body, the frame including first and second mounting pieces extending therefrom,
        wherein the mounting portion of each of the support arms is rotatably mounted on the frame,
        wherein the support member of the hinge mechanism is disposed at substantially the same height as that of a viewfinder disposed on the apparatus body; and
    wherein the frame supports the viewfinder such that the mounting portion of each of the pair of support arms is disposed between the mounting pieces and the viewfinder.

2. The imaging apparatus according to claim 1, wherein the viewfinder includes a display section for displaying an image captured by the apparatus body, and a lens section for focusing on the image displayed on the display section, and wherein the lens section is disposed nearer to a back side of the apparatus body than the display section and at a position lower than the display section.

3. The imaging apparatus according to claim 1, wherein the viewfinder and the mounting portion of each of the support arms are contained in an eyecup.

4. The imaging apparatus according to claim 1, wherein each mounting piece has a limiting protrusion which limits the rotation range of the support member.

5. The imaging apparatus according to claim 4, wherein each mounting portion has an engaging piece configured to engage the limiting protrusion.

6. The imaging apparatus according to claim 1, wherein the length in the height direction of each mounting piece becomes narrower from a bottom end to a top end of the frame.

7. The imaging apparatus according to claim 1, further including a flexible substrate connecting the apparatus body and the monitor, the flexible substrate extending through the hinge mechanism to the monitor.

8. The imaging apparatus according to claim 7, wherein the support member includes a connecting plate portion located between the pair of support arms.

9. The imaging apparatus according to claim 8, wherein the hinge mechanism includes a hinge cover attached to the connecting plate portion, the hinge cover configured to prevent the flexible substrate from being exposed from the outside of the support member.

10. The imaging apparatus according to claim 9, further including a shield member rotatably supported on the hinge cover, the shield member configured to shield the flexible substrate from the outside between the eyecup and the hinge cover.

11. The imaging apparatus according to claim 10, wherein the hinge mechanism includes a torsion coil spring configured to rotationally urge the shield member continuously in a direction around a spindle of the hinge cover thereby preventing a gap between an opening of the eyecup and the shield member.

12. An imaging apparatus, comprising:
    an apparatus body;
    a monitor connected to the apparatus body; and
    a hinge mechanism including
        a support member including;
            a pair of support arms each having a mounting portion at one end and a supporting portion at the other end, the mounting portion of each of the support arms being rotatably mounted on the apparatus body and the supporting portion of each of the support arms configured to rotatably support the monitor relative to the apparatus body; and
        a frame fixed to the apparatus body;
    wherein the support member and frame are disposed at substantially the same height as that of a viewfinder disposed on the apparatus body; and
    wherein the viewfinder, the mounting portion of each of the support arms, and the frame are contained in an eyecup.

13. The imaging apparatus according to claim 12, further including a flexible substrate connecting the apparatus body and the monitor, the flexible substrate extending through the hinge mechanism to the monitor.

14. The imaging apparatus according to claim 13, further including a shield member and a hinge cover, the shield member rotatably supported on the hinge cover and configured to shield the flexible substrate from the outside between the eyecup and the hinge cover.

15. The imaging apparatus according to claim 14, wherein the hinge mechanism includes a torsion coil spring configured to rotationally urge the shield member continuously in a direction around a spindle of the hinge cover thereby preventing a gap between an opening of the eyecup and the shield member.

16. An imaging apparatus, comprising:
   an apparatus body;
   a monitor connected to the apparatus body;
   a hinge mechanism including
      a support member and a frame;
      a hinge cover coupled to the support member; and
      a shield member rotatably supported on the hinge cover;
   a flexible substrate connecting the camera body and the monitor, the flexible substrate extending through the hinge mechanism to the monitor;
   wherein the hinge cover is configured to prevent the flexible substrate from being exposed from the outside of the support member; and
   wherein the shield member is configured to shield the flexible substrate from the outside between an eyecup and the hinge cover.

17. The imaging apparatus according to claim 16, wherein the hinge mechanism includes a torsion coil spring configured to rotationally urge the shield member continuously in a direction around a spindle of the hinge cover thereby preventing a gap between an opening of the eyecup and the shield member.

* * * * *